United States Patent [19]
Weijland et al.
[11] 3,751,703
[45] Aug. 7, 1973

[54] VIDICON HAVING EXTERNAL LIGHT SOURCE ADJACENT SEALED END, AND LIGHT CONDUCTOR TRANSMITTING LIGHT THEREFROM TO TARGET

[75] Inventors: Willem Paul Weijland; Hans Georg Gerlach; Antonius Joannes Mariea Van den Beld; Louis Maarten Swart, all of Emmasingel, Eindhoven, Netherlands

[73] Assignee: U.S. Philips Corporation, New York, N.Y.

[22] Filed: June 24, 1971

[21] Appl. No.: 156,565

Related U.S. Application Data

[62] Division of Ser. No. 885,914, Dec. 17, 1969, Pat. No. 3,628,076.

[52] U.S. Cl. ........... 313/65 LF, 178/7.87, 350/96 B
[51] Int. Cl. ........................ H01j 31/38, H01j 29/89
[58] Field of Search ........... 313/65 R, 65 A, 65 LF; 178/7.87

[56] References Cited

UNITED STATES PATENTS

| | | | |
|---|---|---|---|
| 2,915,659 | 12/1959 | Goodman | 313/65 R |
| 3,048,728 | 8/1962 | Beurle | 313/66 X |
| 3,058,021 | 10/1962 | Dunn | 313/65 LF |
| 3,334,236 | 8/1967 | Bacon | 250/227 X |
| 3,496,368 | 2/1970 | Denner | 250/217 R |

*Primary Examiner*—Robert Segal
*Attorney*—Frank R. Trifari

[57] ABSTRACT

A television camera tube of the vidicon type in which a photoconductive screen at one end of an evacuated envelope receives an image of a scene to be televised and is scanned by an electron beam. An external auxiliary light source is provided for uniformly illuminating the screen and light from this source is conducted through a light conductor to the tip of an exhaust tube for the envelope opposite the screen so that the screen is illuminated uniformly by light from the auxiliary light source.

3 Claims, 4 Drawing Figures

Figure 1:
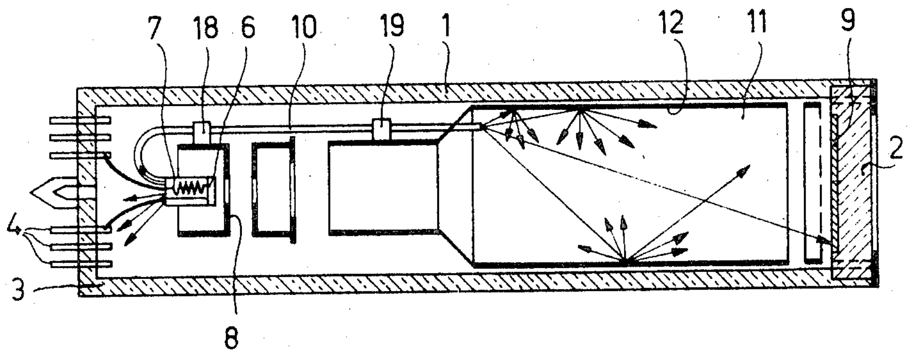

VIDICON HAVING EXTERNAL LIGHT SOURCE ADJACENT SEALED END, AND LIGHT CONDUCTOR TRANSMITTING LIGHT THEREFROM TO TARGET

This application is a division of application Ser. No. 885,914, filed Dec. 17, 1969, now U.S. Pat. No. 3,628,076, issued Dec. 14, 1971.

The invention relates to a camera tube of the vidicon type comprising a photoconductive screen. The invention relates in particular to a Plumbicon.

In such a camera tube the drawback is experienced that, in the case of low-luminosity pictures, inertia phenomena may occur as a result of the high resistance of the photoconductive layer of the screen in the case of such low luminosity exposures. These inertial phenomena can be reduced by ensuring that also in case no light of a picture is incident the screen passes a given quiescent current, the so-called dark current. This dark current can be controlled by providing a given uniform auxiliary illumination or background illumination of the screen. This could be done by incorporating a weak light source in the camera in which the tube is provided. However, in this case it is necessary to provide elements in the optical path of the tube, which may give rise to disturbances and light reflections, particularly in colour cameras in which the optic are very critical. Moreover, in that case, one is not free in the choice of the colour of the auxiliary light-source.

A considerable improvement is obtained if the tube according to the invention comprises one or more light conductive members which conduct light from an auxiliary light source in the direction of the photoconductive screen. The auxiliary light source may be the filament of the cathode of the tube itself but a larger control range of the dark current can be obtained by the light of a separate light source, if desirable in combination with colour filters. By conducting additional light to the photoconductive screen, while using a light conductor, this auxiliary light can be transferred, for example, to the collector space of the tube and from there distributed uniformly over the photoconductive screen by diffuse reflection.

As is known per se, the light conductor may consist of a glass rod which is suitably bent so that the light of a light source situated in front of one end of the rod emanates at the other end from the rod. If desirable the light-conductor may be formed entirely or partly by the wall of the envelope of the tube itself.

The invention will be described with reference to the accompanying drawing, in which:

FIGS. 1, 2, 3 and 4 are diagrammatic longitudinal cross-sectional views of vidicon tubes according to the invention employing lightconductors having various shapes.

Reference numeral 1 in the drawing denotes the cylindrical glass wall of a television tube which is closed at one end by a glass window portion 2 and at the other end by a bottom portion 3 having contact pins 4 which engage contact springs in a holder 5.

The tube comprises a cathode 6 which is heated by a filament 7. The cathode 6 is surrounded by a Wehneit electrode 8, and may be open at the lower side so that the light of the filament can emanate.

A photoconductive screen 9 is situated on the inside of the window portion 2.

In order to reduce inertia phenomena in the case of a low luminosity of a picture projected on the screen 9 through the window 2, it is desirable to provide a low uniform background illumination of the screen 9.

As is shown in FIG. 1, this is done by means of a rod-shaped light conductor 10 which is bent at one end in such manner that a part of the light irradiated by the filament 7 is guided through the light conductor 10 to the collector space 11 inside the last electrode 12 of the electron lense of the tube and emerges there from the light-conductor. The cathode is optically open at its lower side, so as to permit the filament light to emanate. The light-conductor 10 can be supported by electrodes of the tube by means of clamping members 18, 19. The electrode 12 comprises an inner wall which is processed so that the light is reflected in a diffuse manner and is uniformly distributed over the photoconductive screen 9. The control of the light guided to the screen 9 can be obtained within certain limits by varying the filament current 7. However, one is restricted to the minimum operating temperature of the cathode, while the maximum adjustable temperature may not reduce the life-time too strongly. The limits within which the background light can be controlled therefore are comparatively narrow.

Figure 2:
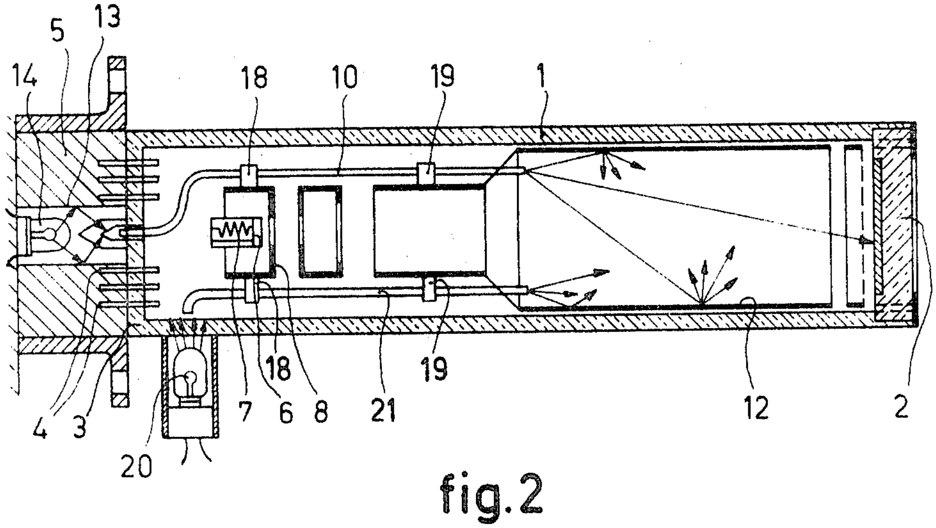

A larger control range is obtained in the embodiment shown in FIGS. 2 snd 3.

In FIG. 2 the light conductor 10 is bent at one end in such manner that said end can be passed out through the aperture of the exhaust tube in the bottom of the tube, and be sealed in the tip of the exhaust tube. The tip of the exhaust tube is surrounded by a sheath 13 in whcih a light source 14 is situated. The sheath 13 may be housed in the holder 5 of the tube. It is alternatively possible to bend the end of the light conductor 21 towards the inside of the side wall of the envelope of the tube and to place a light source 20 at that area on the outside. The end of the light-conductor need not touch the side-wall (see FIG. 2). If desirable, a colour filter can be arranged between the light source 14 and the photoconductive screen. The colour filter can be provided between the light source and the end of the light conductor, or near the end of the lightconductor. If desirable, the light conductor itself may consist of coloured material. If the end of a rod-shaped light conductor ends opposite to the sidewall of the tube, the side wall of the envelope may be manufactured from coloured glass or a colour filter may be provided on the wall. Naturally, the colour filter may also be provided on the envelope of the light source itself.

Figure 3:
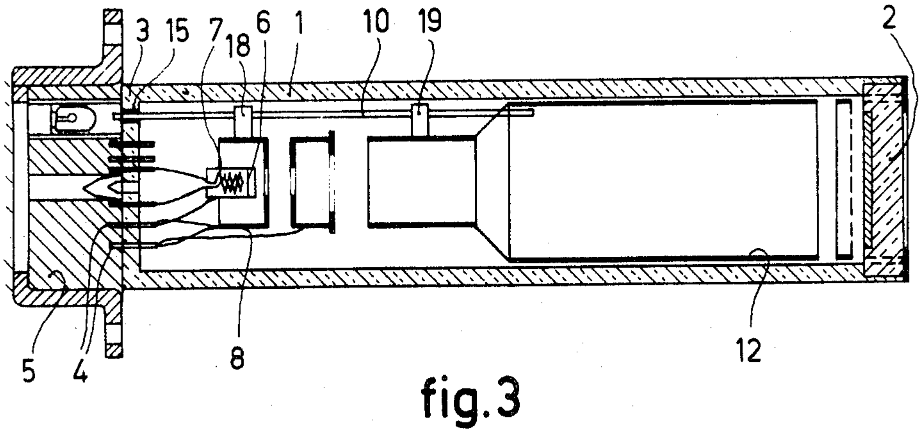
Figure 4:
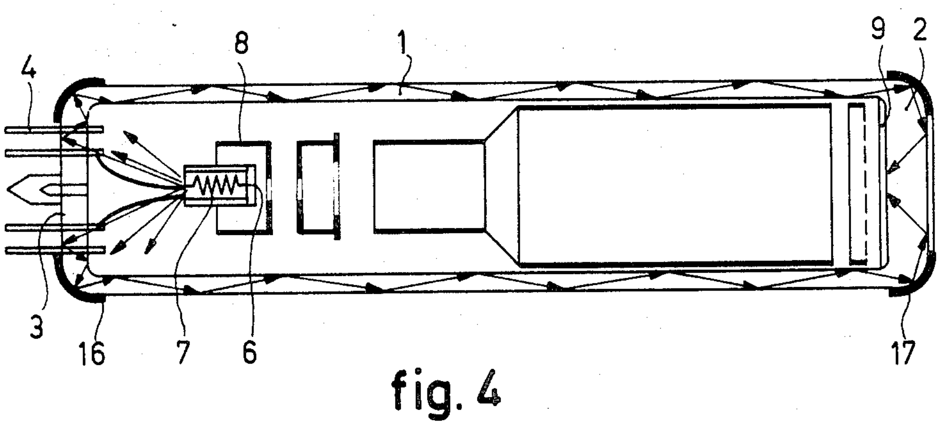

It is alternatively possible to give the light conductor a straight construction and seal it in the bottom of the tube, preferably by means of a plastic material or a readily melting type of glass 15. Leading through can take place at the area of an omitted contact pin. In this case also a sheath 13 having a light source 14 may be provided in the holder 5 of the tube (FIG. 3). In order to obtain a more uniform illumination of the screen 9, two light conductors are preferably used.

In the embodiment shown in FIG. 4, again the light irradiated by the filament of the cathode is used. By rounding off the edges of the bottom 3 of the tube, and in particular of the window portion 2, and by covering the rounded-off edges with an external readily reflecting layer, for example, a layer of silver 16 and 37 respectively, it can be achieved that the light rays which have reached the bottom of the tube are conveyed through the wall 1 of the tube to the window 2 and impinge upon the photoconductive screen 9 in a uniformly distributed manner. The radius of the rounding off of the window portion is preferably equal to the thickness of the glass of the window portion. The layer of silver 16 may be connected to a screening means while the layer of silver 17 may serve as an electric current supply member for the screen 9. This latter embodiment as the advantage that the construction of the electrodes can remain the same. Light-conductors are known per se. Instead of a single glass rod, the light conductor may also consist of a bundle of glass wires 22 which extend parallel and are adhered together.

It will be obvious that the invention is not restricted to the examples described and that many variations are possible to those skilled in the art without departing from the scope of this invention. For example, the light-conductor may be formed differently within the scope of this invention. Alternatively, several embodiments may be combined.

What is claimed is:

1. A television camera comprising an evacuated envelope having an exhaust tube with a substantially triangular sealed tip and a transparent wall portion opposite said exhaust tube, a photoconductive target having one surface facing said transparent wall portion for receiving an image of a scene, means to scan the opposite side of said screen with an electron beam thereby generating an electrical current corresponding to light variations in said scene, said scan means including an electron gun for generating an electron beam remote from the screen and means to deflect the electron beam before it impinges on the screen, and means for uniformly illuminating the target comprising an electrode between said electron gun and target, said electrode having a section of reduced size nearer said gun and a section of greater size nearer said target, said sections being connected by a frustoconical section, a rod-shaped light-conductor terminating in the sealed tip of the exhaust tube and extending therefrom through an aperture in said frustoconical section, a light source external to said envelope and adjacent said sealed tip, and means for directing light from said source through said tip to said light-conductor, whereby light from said source is transmitted to said target.

2. A television camera tube as claimed in claim 1 wherein the light-conductor comprises a bundle of adherent glass wires.

3. A television camera tube as claimed in claim 1 wherein a color filter is positioned between the light source and the light-conductor.

* * * * *

PO-1050
(5/69)

UNITED STATES PATENT OFFICE
CERTIFICATE OF CORRECTION

Patent No. 3,751,703 Dated August 7, 1973

Inventor(s) WILLEM P. WEIJLAND ET AL

It is certified that error appears in the above-identified patent and that said Letters Patent are hereby corrected as shown below:

In the heading, change "Mariea" to read --Maria--.

Col. 1 line 61, change "Wehneit" to read --Wehnelt--.

Col. 2, line 64, change "37" to read --17--.

Signed and sealed this 19th day of February 1974.

(SEAL)
Attest:

EDWARD M.FLETCHER,JR.
Attesting Officer

C. MARSHALL DANN
Commissioner of Patents